(12) United States Patent
Chigusa

(10) Patent No.: US 7,233,879 B1
(45) Date of Patent: Jun. 19, 2007

(54) SYSTEM AND METHOD OF AGENT SELF-REPAIR WITHIN AN INTELLIGENT AGENT SYSTEM

(75) Inventor: Shunsuke Chigusa, Arlington, MA (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 11/430,382

(22) Filed: May 9, 2006

(51) Int. Cl.
  *G06F 11/30* (2006.01)
  *G21C 17/00* (2006.01)
(52) U.S. Cl. .................................... 702/184
(58) Field of Classification Search ........ 702/182–185; 717/124, 126; 714/25, 31
  See application file for complete search history.

(56) References Cited

U.S. PATENT DOCUMENTS

| | | | |
|---|---|---|---|
| 5,124,909 A | 6/1992 | Blakely et al. | |
| 5,375,207 A | 12/1994 | Blakely et al. | |
| 5,870,768 A | 2/1999 | Hekmatpour | |
| 5,944,783 A | 8/1999 | Nieten | |
| 5,953,514 A | 9/1999 | Gochee | |
| 6,012,152 A | 1/2000 | Douik et al. | |
| 6,023,565 A | 2/2000 | Lawman et al. | |
| 6,108,616 A | 8/2000 | Borchers et al. | |
| 6,349,342 B1 | 2/2002 | Menges et al. | |
| 6,505,231 B1 | 1/2003 | Maruyama | |
| 6,684,285 B2 | 1/2004 | Farmwald et al. | |
| 6,769,125 B2 | 7/2004 | Menges et al. | |
| 6,912,522 B2 | 6/2005 | Edgar | |
| 6,950,782 B2 | 9/2005 | Qiao et al. | |
| 6,996,667 B2 | 2/2006 | Aoki et al. | |
| 2006/0031538 A1 | 2/2006 | Motoyama et al. | |
| 2006/0064291 A1* | 3/2006 | Pattipatti et al. ............... | 703/14 |

OTHER PUBLICATIONS

Shunsuke Chigusa, "System and method of intelligent identification for vehicle diagnostics", Nov. 18, 2005, U.S. Appl. No. 11/282,925.*
Robert-Jan Beun et al. "Ontological Feedback in Multiagent Systems" Autonamous Agents and Multi-Agent Systems '04 Conference, Jul. 19-23, 2004, New York, NY USA, pp. 110-117.
Weiss et al, "Design and Implementation of a Real-Time Multi-Agent System," 1998, IEEE Article, pp. 1269-1273.

* cited by examiner

*Primary Examiner*—Michael Nghiem
(74) *Attorney, Agent, or Firm*—Gifford, Krass, Sprinkle, Anderson & Citkowski, P.C.

(57) ABSTRACT

A system and method of intelligent agent self-repair for an intelligent agent system in a vehicle is provided that includes a host system in communication with an intelligent agent via a communications network. An executable software program verifies if the agent work procedure list matches a corresponding work procedure list for the agent that is stored in the memory of the host system. Execution of the agent work procedure list by the agent is ceased and the agent is repaired by transmitting a new work procedure list to the agent from the host information database, if the agent work procedure list is not verified. The agent continues to execute the work instructions if the agent work procedure list is verified or the agent is repaired.

7 Claims, 2 Drawing Sheets

SYSTEM AND METHOD OF AGENT SELF-REPAIR WITHIN AN INTELLIGENT AGENT SYSTEM

BACKGROUND OF THE INVENTION

1. Field of the Invention

The present invention relates generally to computer-assisted vehicle diagnostics and, more specifically, to a system and method of agent self-repair within an intelligent agent system.

2. Description of the Related Art

Vehicles, and in particular motor vehicles, frequently incorporate monitoring systems that function to monitor the status of various vehicle components. An on-board diagnostic system (OBD) is frequently utilized in monitoring the engine, emissions, transmission or other key vehicle systems. The information obtained by such a monitoring system may be useful in detecting a vehicle condition, such as a malfunction, or other such abnormal operating condition. A key feature of the on-board diagnostic system is the ability to notify the vehicle operator of the detected vehicle condition. Early detection, diagnosis, or notification of a malfunction is important to the continued operation of the vehicle.

While the on-board diagnostic systems work well, they may not provide information regarding causation. Intelligent agent diagnostic systems are known to collect and transfer data within an electronic system that may be relevant to causation. An example of a multi-agent diagnostic system for a vehicle that can detect and isolate a fault is described in commonly assigned U.S. patent application Ser. No. 10/629,035, filed on Jul. 28, 2003, now U.S. Pat. No. 6,950,782, which is incorporated herein by reference. A further example of a system and method of intelligent agent identification for use in conjunction with a multi-agent diagnostic system is disclosed in commonly assigned U.S. patent application Ser. No. 11/282,925, filed on Nov. 18, 2005.

The above-described systems and methodologies work well for fault isolation. It also works well in providing security concerning the ingress and egress of an agent to the system. However, it does not provide an agent with a self-repair function. Thus, there is a need in the art for a system and method of intelligent agent self-repair for an intelligent agent system that improves the integrity of the intelligent agent system by allowing for self-repair of agents within the electronic system and thus preventing the dissemination of information from a malicious agent.

SUMMARY OF THE INVENTION

Accordingly, the present invention is a system and method of intelligent agent self-repair for a vehicle.

The system includes a host system in communication with an intelligent agent via a communications network. An executable software program verifies if the agent work procedure list matches a corresponding work procedure list for the agent that is stored in the memory of the host system. Execution of the agent work procedure list by the agent is ceased and the agent is repaired by transmitting a new work procedure list to the agent from the host information database, if the agent work procedure list is not verified. The agent continues to execute the work instructions if the agent work procedure list is verified or the agent is repaired.

One advantage of the present invention is that a system and method of agent self-repair within an intelligent agent system is provided that facilitates repair of a flawed intelligent agent within a vehicle. Another advantage of the present invention is that a system and method of intelligent agent self-repair is provided that assists in controlling the access of agents to an electronic system for the vehicle. A further advantage of the present invention is that a system and method of intelligent agent self-repair is provided that prevents further access to the electronic system by an invalid agent.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
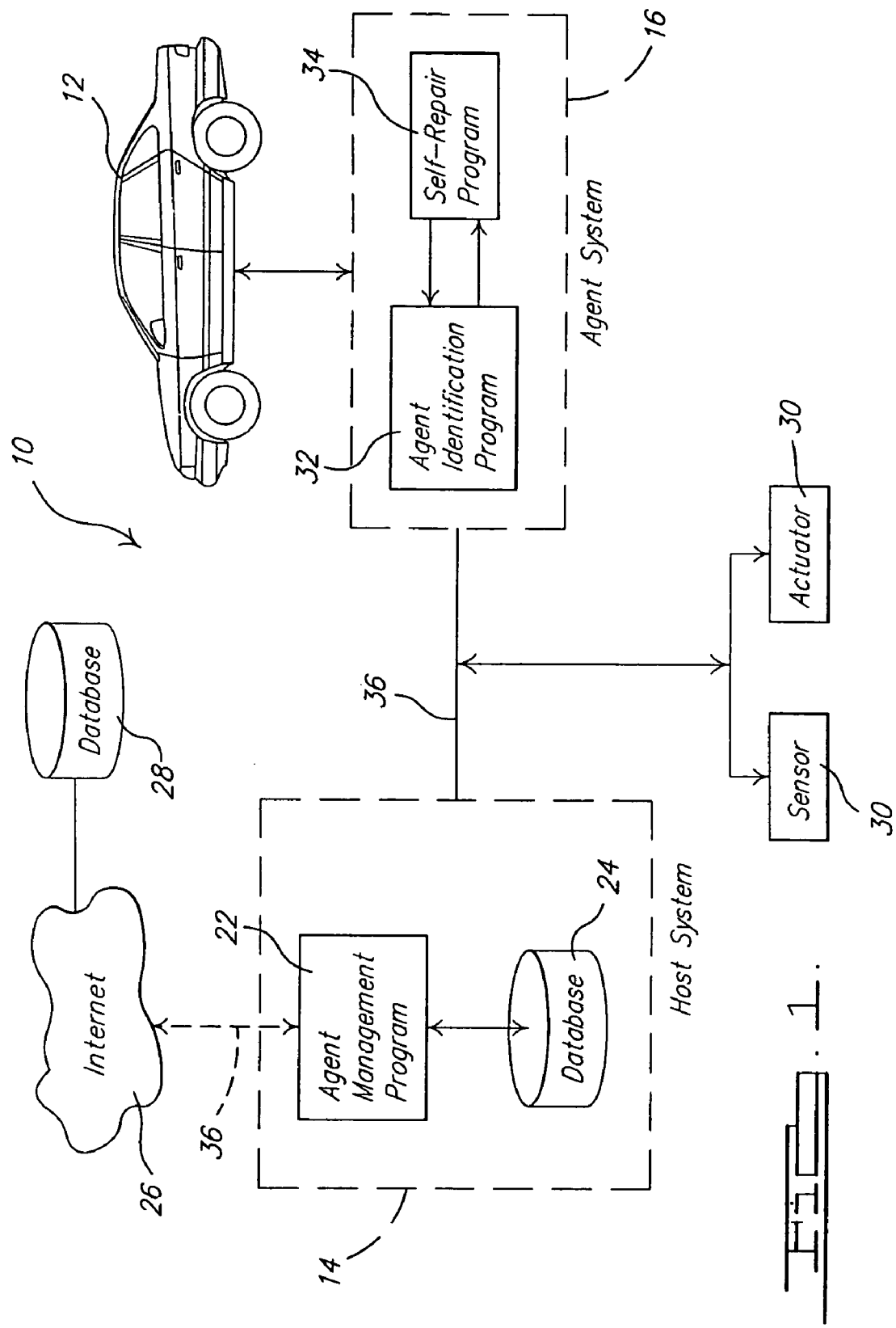
FIG. 1 is a diagrammatic view of a system for use in conjunction with a method of self-repair within an intelligent agent system in a vehicle, according to the present invention.

Referring to FIG. 1, a system for agent self-repair within an intelligent agent system in an electronic system is provided. In this example, the electronic system is incorporated in a vehicle 12, and in particular an automobile. The vehicle electronic system includes an intelligent agent self-repair feature. Expert agents, each having a specific function, are dispersed within the electronic system of the vehicle 12 in order to monitor its behavior.

The system for intelligent agent self-repair 10 has at least one intelligent agent 30 disposed within the vehicle electronic system in a predetermined manner. For example, a plurality of agents 30 may be arranged in hierarchical layers. The agents 30 provide data that is analyzed and utilized by the vehicle 12. In this example, the data is used for intelligent vehicle diagnostics. The intelligent agent encompasses many forms. For example, the intelligent agent may be a sensing means, such as a sensor. The intelligent agent may be an electronic control having a microprocessor, a memory, an input, an output and necessary operating software. The intelligent agent may also be an application Specific Integrated Circuit (ASIC) incorporated into a computer controller. As such, the system may include various types of agents, depending on the diagnostic task to be performed. One function of the agent 30 is to carry program code to a particular component in the electronic system of the vehicle. Recognition of the agent 30 is advantageous in preserving the integrity of the vehicle component. A damaged agent 30 may carry code that could have a negative impact on the vehicle component.

The intelligent agent 30 also carries an identification code, to be described, and identification information identifying the host computer system 14. The identification information is useful for identification verification purposes. The type of identification information may be a name or number or the like and the format is non-limiting.

The system for agent identification 10 includes a communication network 36 that selectively receives, transmits or monitors data communications between the various system components within the intelligent agent system 10. Various different types of communication means may be incorporated within the communication network 36. The connection between the various communication means may be wired or wireless or the like. An example of a wired connection means is a data bus. An example of a LAN/WAN communication means is an intranet or internet 26. The communication network may include other linked communication devices, such as facsimile, telephone, pagers or cellular phones or the like.

The system for agent identification includes a host system 14 operatively in communication with a local system 16 via the communication network 36. Both the host system 14 and local system 16 are also operatively in communication with the agent 30 via the communication network 36. The host computer system 14 includes a processor 22, a memory means 24 associated with the processor, an input/output interface means, and operational software programs. In this example, the host system 14 is a server. It should be appreciated that various other peripheral devices may be operatively connected to the host system 14, such as another remotely located data storage device 28, or a printer. Preferably, the host system 14 is a central facility remotely located from the vehicle 12.

The memory means 24 may be integral with the processor, or operatively in communication with the processor. There may be more than one memory means associated with the processor. An example of a memory means is a data storage device, including a fixed memory device 24, such as a hard drive or the like. Alternatively, the memory means is a removable memory, such as a memory stick, scan disc, compact disc or the like. The memory means may include a database of information that is beneficial to performing diagnostic fault isolation, such as a knowledge database or the like.

The host system 14 maintains several software programs. These software programs are preferably maintained in the memory means 24 associated with the processor. One software program is an agent management software program that coordinates the location and activities of the various agents 30 disposed within the system. In particular, the agent management software program coordinates activities such as the addition of an agent, the deletion of an agent, the education of an agent and the generation of an identification code for the agent. An example of an agent management program is described in U.S. patent application Ser. No. 11/282,925, which is incorporated herein by reference.

The system also includes a local system 16 which is located at the vehicle level. An example of a local system 16 for a vehicle is an electronic control unit, or ECU. The local system 16 includes a processor 34, a memory means 32 associated with the processor 34, a communication means and an output means. There may be more than one memory means associated with the processor. An example of a memory means is a data storage device. For example, the data storage device may be a fixed memory device, such as a database or the like. Alternatively, the memory means is a removable memory, such as a memory stick, memory card or the like.

The local system hosts several software programs. These software programs are preferably maintained in the memory means associated with the processor. One example of a software program within the local system is an application software program. This software program executes the program code carried by the identified agent, such as instructions to perform a particular function. This function may include data logging, user input or output, or diagnostics or the like.

Another software program is an agent self-repair software program that identifies an agent in need of repair, and repairs the agent using the methodology to be described. The agent self-repair software program advantageously distinguishes between an allowable agent and a corrupted agent, and repairs the corrupted agent. The agent self-repair software program is operatively in communication with the other agent software programs, such as the previously described agent management program. In this example, the agent self-repair software program is resident in the local system 16, although it could be at the host system level or agent level.

The system for agent identification 10 may include other components or features relevant to the above-described system and the method to be described. For example, the system may include an indicator means for providing a message to the vehicle operator. The indicator means may be a visual means, such as an LED, CRT or LCD display or the like; or an audio means, such as a voice alarm or sound alarm or the like; or any other means of alerting the vehicle operator. The system may include an interactive means for transmitting an input from the vehicle operator to the intelligent diagnostic system.

Figure 2:
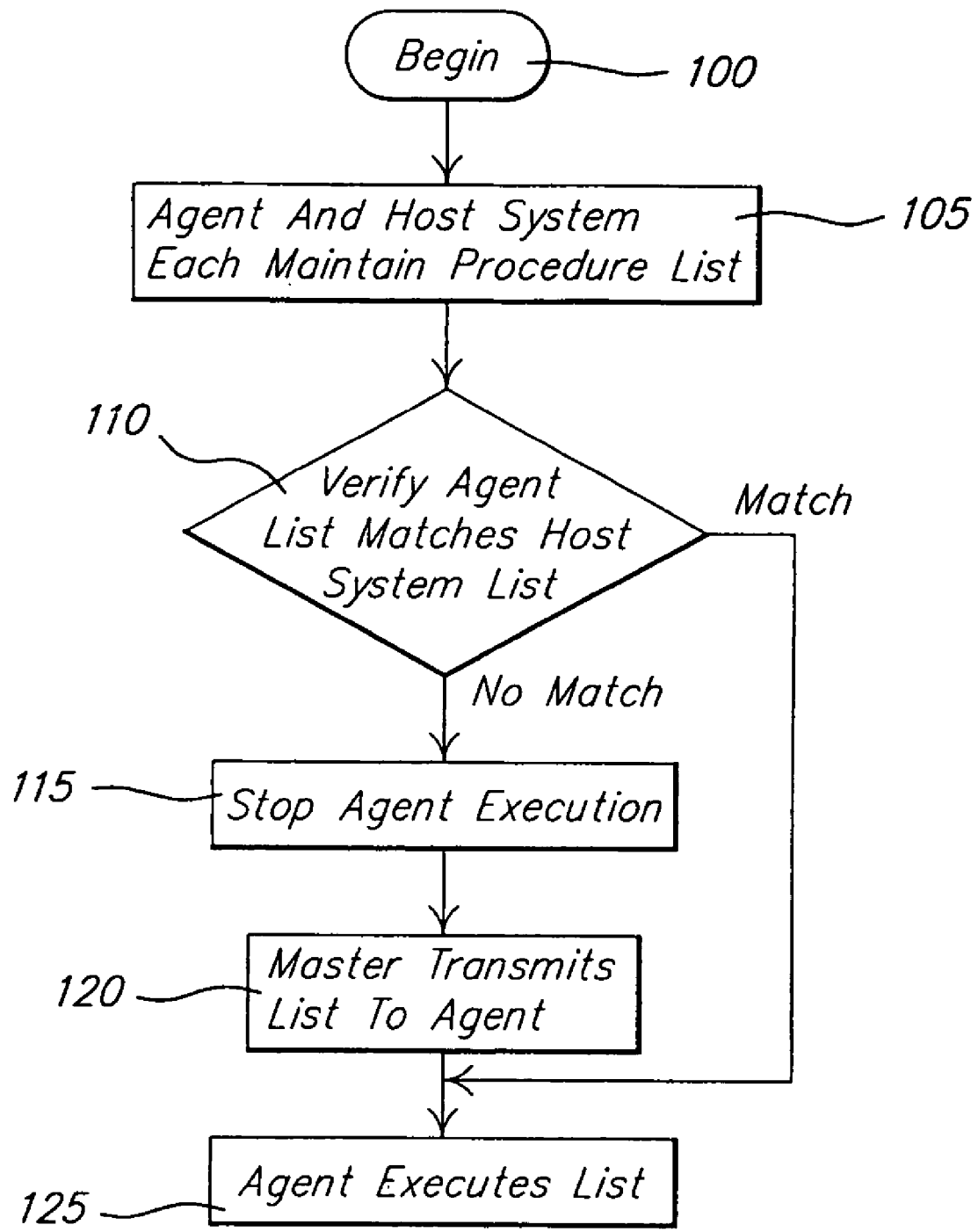
FIG. 2 is a flowchart illustrating the method of agent identification self-repair using the system of FIG. 1, according to the present invention.

Referring to FIG. 2, a method of agent self-repair within an intelligent agent system is provided. The method is implemented by the intelligent agent self-repair system 10 described with respect to FIG. 1. It should be appreciated that in this example, the agent selection and the receiving or destination system is made by the agent management program. Various factors may be considered in making these selections, such as the availability of the receiving agent, the location of the receiving agent, or the like.

The methodology repairs an identified agent 30 seeking entry into either the host system 14 or the local system 16, or another agent within a hierarchical arrangement of agents. The methodology begins in block 100 and continues to block 105.

In block 105, the agent receives a self-processing procedure list. The list comes from the host system 14, a local system or another agent. In this example, the list is from the host system. The procedure list contains executable information for the agent 30, such as program code or script. It should be appreciated that the program code may contain work instructions for the agent. The agent 30 executes the work instructions and obtains information. In this example, the information is useful in the diagnostics of the electronic system of the vehicle. One example of a work instruction is to sense a temperature of predetermined component. Another example of a work instruction is to sense a speed of a predetermined component. Preferably, the information in the procedure list is encrypted. Various encryption techniques are available in the art. It should be appreciated that the encryption may be performed at the host or alternatively the receiving system level. A non-limiting example of an encryption technique is the Data Encryption Standard (DES), a symmetric algorithm adopted in the United States as a federal standard. Another technique is the International Data Encryption Algorithm (IDEA). Other commonly available asymmetric techniques are the RSA algorithm, Pretty Good Privacy (PGP), Secure Sockets Layer (SSL), and Secure Hypertext Transfer Protocol (S-HTTP). A Clipper algorithm (called Skipjack) is specified in the Escrow Encryption Standard (EES), a voluntary federal standard for encryption of voice, facsimile (fax), and data communications over ordinary telephone lines.

The methodology advances to block 110, and the procedure list carried by the agent is compared to the procedure list for the agent that is maintained by the host system 14. It should be appreciated that the information may be encrypted, in which case the information is first decoded. The agent procedure list can be verified, such as by comparing the information in the agent list with the corresponding information in the host list. The host system and agent system each utilize the same decipherment rule, in order to compare the code carried by the agent with the code maintained by the host system of this example.

If there is a match between the decoded list carried by the agent and the decoded list maintained by the host system, the methodology advances to block 125, to be described, and continues.

If the agent list does not match the host list, it is presumed that there is a problem with the agent list, and the methodology advances to block 115.

In block 115, the methodology assumes that the agent is in need of repair, and execution of the agent's activities corresponding to the list ceases. It should be appreciated that the host system or local system or another agent in the hierarchy of agents may stop the agents.

The methodology advances to block 120 and the agent is repaired. For example, a copy of the instructions maintained by the host system corresponding to a particular agent is retransmitted to the agent.

The methodology advances to block 125 and the agent uses the information contained in the list to execute the instructions contained in the list. It should be appreciated that since the list contains the agent's identification code, it is read and executed by the identified agent, and not by a non-identified agent.

In this example, the host system utilizes information from the agent for vehicle diagnostic analysis.

It should be appreciated that the methodology may include other steps necessary for the implementation of the method. Further, the steps may be executed in another order, while achieving the same result.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A method of intelligent agent self-repair for an intelligent agent system in a vehicle, said method including the steps of:
    maintaining an encrypted work procedure list by an intelligent agent, wherein the intelligent agent includes a processor and a memory associated with the processor and the agent work procedure list is embedded in the memory and contains executable instructions for the agent;
    comparing the agent work procedure list with a corresponding host work procedure list for the agent that is stored in the a memory of a host system, wherein the host system includes a processor, a memory associated with the host system processor, and an input/output means;
    stopping execution of the agent work procedure list by the agent if the agent work procedure list does not match with the host work procedure list and repairing the agent by replacing the agent work procedure list with the host work procedure list for the agent from the host system; and
    executing the instructions by the agent using the agent work procedure list.

2. A method as set forth in claim 1 wherein said step of comparing further includes the step of comparing information in the agent work procedure list with corresponding information in the host work procedure list for the agent.

3. A method as set forth in claim 1 wherein said step of stopping execution further includes the step of transmitting a copy of the host work procedure list for the agent from a host information database that is in communication with the host system.

4. A method as set forth in claim 1 wherein said work procedure list contains executable work instructions to be performed by the agent.

5. A method of intelligent agent self-repair for an intelligent agent system in a vehicle, said method including the steps of:
    maintaining an encrypted work procedure list by an intelligent agent, wherein the intelligent agent includes a processor and a memory associated with the processor and the agent work procedure list is embedded in the memory and contains executable work instructions for the agent;
    comparing information in the agent work procedure list with corresponding information in the host work procedure list for the agent, wherein the host system includes a processor, a memory associated with the host system processor and an input/output means, and the host work procedure list for the agent is embedded in a memory associated with a host information database that is in communication with the host system;
    stopping execution of the agent work procedure list by the agent if the agent work procedure list does not match with the host work procedure list and repairing the agent by replacing the agent work procedure list with the host work procedure list for the agent from the host information database by transmitting a copy of the host work procedure list for the agent from the host information database to the agent; and
    executing the instructions by the agent using the agent work procedure list.

6. A system of agent self-repair within an intelligent agent system for a vehicle comprising:
    an agent within the vehicle having a processor and a memory associated with the processor, wherein said agent maintains an encrypted agent work procedure list embedded in the memory and contains executable work instructions for the agent;
    a host system operatively in communication with said agent via a communications network, wherein said host system includes a processor, a memory associated with the processor and an input/output means;
    an executable agent self-repair software program stored in the memory of the host system that verifies if the agent work procedure list matches a corresponding host work procedure list for the agent that is embedded in the memory of the host system by comparing the agent work procedure list with the host work procedure list for the agent and ceases execution of the agent work procedure list by the agent and repairs the agent by replacing the agent work procedure list embedded in the memory of the agent with the host work procedure list for the agent if the agent work procedure list is not verified and the agent executes the work instructions in the agent work procedure list.

7. The system of claim 6 wherein said agent work procedure list contains executable work instructions to be performed by the agent.

* * * * *